Figure 1:
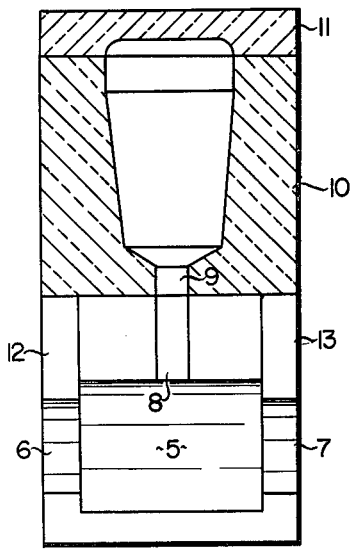

Feb. 15, 1966   H. R. LEUTHY ETAL   3,234,603
BUTT JOINING OF STEEL BARS AND THE LIKE
Filed May 29, 1961   3 Sheets-Sheet 1

INVENTOR.
HENRY R. LEUTHY &
BY   LEONARD GELFAND

Oberlin, Maky & Donnelly
ATTORNEYS

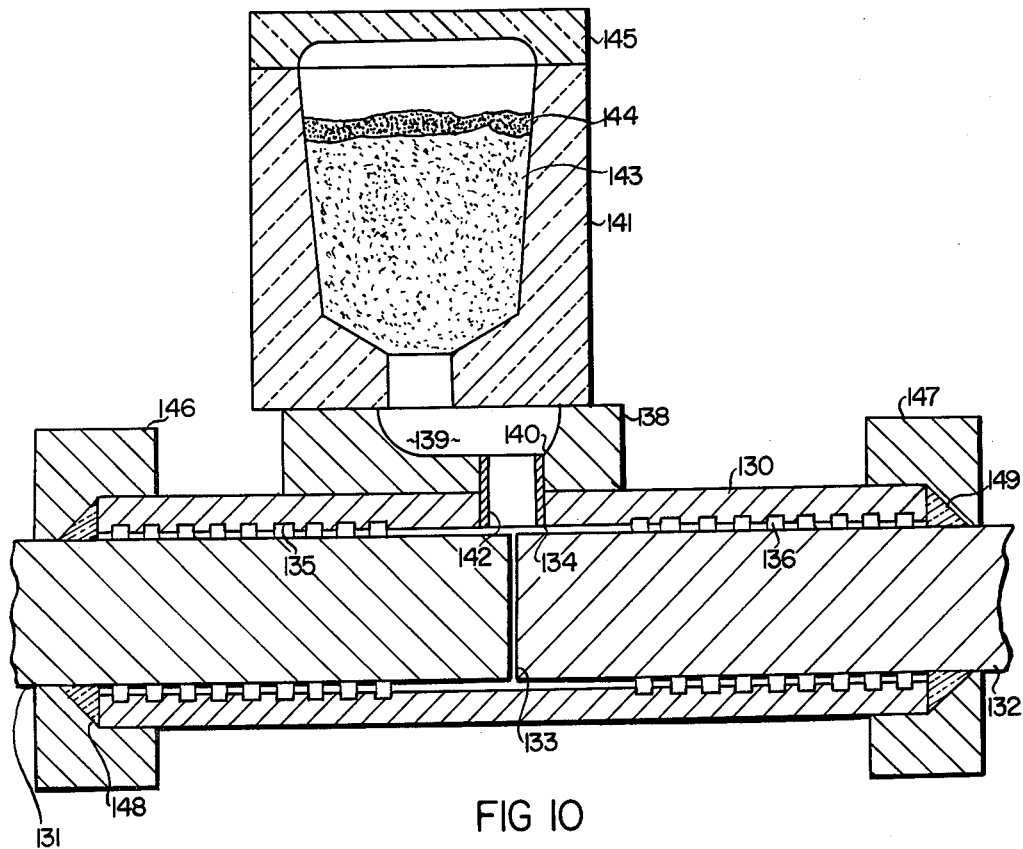
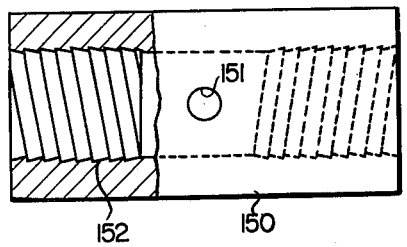
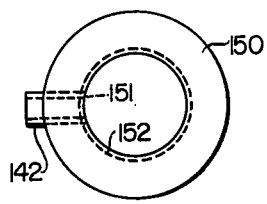
FIG 10
FIG 11
FIG 12
INVENTOR.
HENRY R. LEUTHY &
BY  LEONARD GELFAND
Oberlin, Maky & Donnelly
ATTORNEYS

United States Patent Office 3,234,603
Patented Feb. 15, 1966

3,234,603
BUTT JOINING OF STEEL BARS AND THE LIKE
Henry R. Leuthy, Cleveland, and Leonard Gelfand, Cleveland Heights, Ohio, assignors to Erico Products, Inc., Cleveland, Ohio, a corporation of Ohio
Filed May 29, 1961, Ser. No. 113,527
13 Claims. (Cl. 22—58)

This invention relates, as indicated, to the butt joining of steel bars and the like and more particularly to a method and apparatus for joining high carbon or alloy steel bars such as concrete reinforcing bars.

Heretofore, when butt welding small steel reinforcing bars and the like, it has been conventional either to arc weld or to employ cast weld metal both to weld the ends together and also to sleeve the adjacent end portions of the bar to a considerable thickness of cast metal. When welding large bars such as those greater than four square inches in cross-section (in reinforcing bars, a No. 18S is 2¼″ in diameter) this would require a very large amount of weld metal and produce a very bulky weld. Such bulky welds are also disadvantageous since the purpose generally in employing large size steel bars is to reduce the overall dimensions of the concrete column or beam structure in which they are employed.

Sleeve joints have been employed for heavy column reinforcement in which the stress will always be compressive, but here only the ends of the sleeve are peripherally welded to the joined bars. The bars have to be ordered with sawed ends and the deformations in the bars make it difficult properly to weld the sleeve to the bar.

It has been discovered that an oversize steel sleeve which bridges the joint may provide the additional required tensile strength and rigidity without the necessity of a wide diameter cast weld, and an improved weld joint will be obtained. Moreover, with such a joint, the weld metal will fill the space between the sleeve and the bars and generally only mechanically interlocks therewith. In this manner, the ribs, corrugations, grooves, etc. formed on the exterior surface of the steel bars to make them bind better with the concrete can be employed to provide a mechanical interlock and thus a better joint.

It is accordingly a principal object of the present invention to provide a cast welding method and apparatus wherein cast weld metal will be contained within an outer sleeve during the casting operation.

It is another important object to provide a butt joint for reinforcing bars and the like which mechanically interconnects the cast weld metal and the bars being joined.

It is a further important object to provide a cast weld joint for steel bars and the like which employs a tubular sleeve both as a mold and to rigidify the joint.

It is still another object of the present invention to provide a cast joint for steel bars and the like wherein less cast metal need be employed.

It is a still further object to provide a relatively narrow joint for steel bars and the like of extremely high tensile strength and good appearance.

It is yet another object to provide a butt joint for steel bars and the like wherein embrittlement will be limited in the case of high carbon steel bars.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 2:
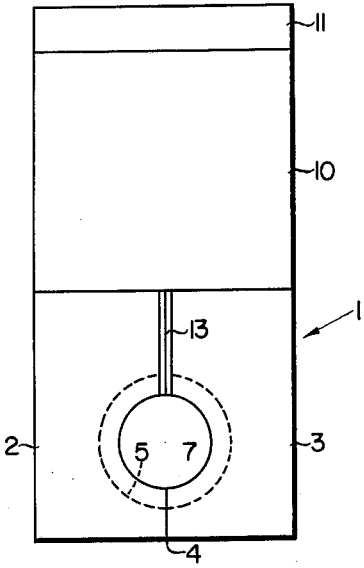
Figure 3:
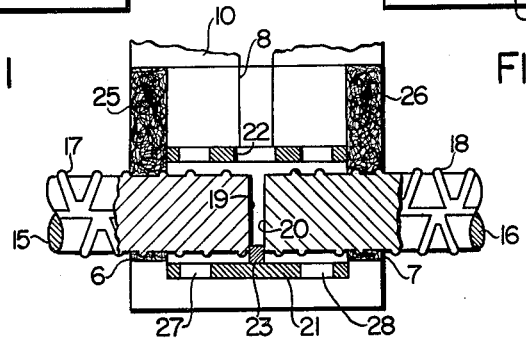
Figure 4:
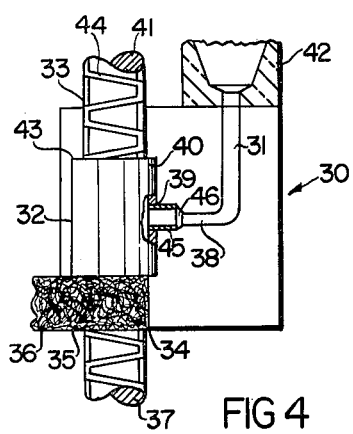
Figure 5:
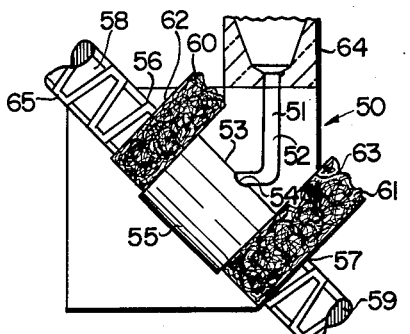

In said annexed drawings:
FIG. 1 is a vertical section of cast welding apparatus in accordance with the present invention for providing a cast butt joint for steel bars and the like;
FIG. 2 is an end elevation of the apparatus of FIG. 1 as seen from the right thereof;
FIG. 3 is a fragmentary view similar to FIG. 1 showing steel bars and a sleeve in place ready for performance of the cast welding operation;
FIG. 4 is a vertical section of apparatus in accordance with the present invention for making a vertical joint with steel reinforcing bars and the like;
FIG. 5 is a vertical section of apparatus for joining such steel bars on an incline;
FIGS. 6 through 9 are fragmentary views of joints employing various types of sleeves in accordance with the present invention with the cast metal omitted in FIGS. 7–9 for clarity of illustration;
FIG. 10 is a cross-sectional view of a preferred form of apparatus for practicing the present invention;
FIG. 11 is a top plan view partially broken away of a steel sleeve that may be employed with the present invention; and
FIG. 12 is an end elevation of the sleeve of FIG. 11.

For the most part, the steel bars joined in accordance with the present invention will be steel reinforcing bars. These steel reinforcing bars range in strength grades from the softest and most ductile, termed "structural grade", up to a grade of very high strength having a specified minimum yield point of 75,000 lbs. per square inch and a minimum tensile strength of 100,000 lbs. per square inch. Sizes of these reinforcing bars in the United States start with No. 2 which is a plain round bar ¼ inch in diameter and range up to No. 18S which is a special size of approximately 2¼ inches in diameter. Most bars larger than No. 2 are "deformed bars" which have lugs or "deformations" rolled on the surface thereof to provide anchorage in the concrete surrounding them in the finished structure. A wide range of steel compositions is employed for the production of reinforcing bars. More and more, however, high carbon and alloy steels are being employed for the large high strength bars.

Referring now to the annexed drawings and more particularly to FIGS. 1, 2 and 3, there is illustrated cast welding apparatus which may be employed to butt join steel bars and the like in accordance with the present invention. A graphite or like mold generally shown at 1 is comprised of two mold halves 2 and 3 which mate along mold parting line 4 to form an elongated central right circular cylindrical cavity 5 having coaxial transverse apertures 6 and 7 adapted to receive the opposed end portions of two reinforcing bars or the like. A sprue hole 8 extends from the top of the cavity communicating with a tap hole 9 in crucible 10. The crucible 10 serves as a container for exothermic welding powder and a cover 11 may be employed to close the top of the crucible. A separate crucible as illustrated need only be employed for large joints, and when joining smaller size bars the mold halves may incorporate the crucible for the welding powders. It will be understood that the passages 6, 7 and 8 leading into the cavity 5 will be formed by semi-circular grooves in the respective mating mold halves 2 and 3.

The mating mold halves also form narrow slots 12 and 13 extending upwardly above the transverse bar receiving openings 6 and 7, the purpose of these slots being to receive a layer of asbestos, graphite, carbon, or alumina-silica ceramic batting which surrounds the irregular exterior surface of the reinforcing bars to provide a seal between the reinforcing bar and the mold apertures 6 and 7 to prevent escape of the weld metal from the cavity 5. One such ceramic or refractory batting and its employment in exothermic welding procedures is more clearly shown and described in the copending application of Leonard Gelfand entitled "Cast Welding Apparatus," Serial No. 104,295, filed April 20, 1961, now abandoned.

Referring now to FIG. 3, there is illustrated the assembled cast welding apparatus prepared for the butt joining of two steel reinforcing bars. As shown, the steel reinforcing bars 15 and 16 are provided with external deformations as at 17 and 18 respectively which necessarily means that the transverse openings 6 and 7 will need be somewhat oversize. Surrounding the spaced opposed ends 19 and 20 of the respective bars, there is provided a concentric steel sleeve 21. While steel is preferred for the sleeve in the illustrated embodiments, it will be understood sleeves of other metals may be employed. It may be noted that the external diameter of the sleeve 21 closely conforms to the diameter of the cavity 5, the sleeve 21 being provided with a top central opening 22. Such opening 22 in sleeve 21 is somewhat larger than and aligned with the sprue opening 8 in the mold 1 and directly over the opposed ends 19 and 20 of the bars 15 and 16. The bars are spaced within the sleeve by means of a shim 23 which may be of copper or steel and is preferably spot or tack welded to the bottom of the sleeve 21. Such shim 23 serves not only properly to space the opposed ends 19 and 20 but also serves to protect the bottom of the sleeve 21 from erosion by the molten weld metal dropping through aperture 22. It will, of course, be understood that a pouring basin may be employed to prevent direct flow of molten metal from the crucible to the mold. The reinforcing bars 15 and 16 are held in their proper position concentrically within the sleeve 21 by the apertures 6 and 7 in the mold. Refractory fibrous batts 25 and 26 of the aforementioned graphite, carbon, or ceramic material will be wrapped around the rough exterior surface of the bars to seal the openings 6 and 7 and thus the cavity 5 with the bars 15 and 16 extending therewithin. The refractory material batting 25 and 26 serves also to protect the graphite mold halves, since if the openings 6 and 7 were too close to the exterior of the bars, expansion or contraction of the bars caused by the welding procedure might crack those portions of the mold. The refractory batts 25 and 26 will also tend to permit the escape of trapped gas.

The sleeve 21 is shown as provided with a series of apertures such as 27 and 28 into which the weld metal will flow to provide a better mechanical lock with the sleeve as well as with the deformations on the exterior surface of the reinforcing bars. When the mold is properly assembled, molten metal may be caused to enter the cavity either by means of the exothermic or thermit process or may be ladled directly into the cavity to fill the interior of the sleeve 21. The molten metal will fill the space between the ends of the bars 19 and 20 and flow transversely outwardly to fill the series of holes 27 and 28 and may eventually fill a portion of the sprue hole 8. The weld metal thus forms a thin sleeve between the bars and the metal sleeve.

The hot weld metal initially dropping into the space between the ends of the bars 15 and 16 may heat the bars and then flow outwardly so that subsequent metal entering the cavity may actually cause the heated bars to coalesce with the weld metal and be welded at their butt faces. However, the weld metal moving laterally outwardly from the butt faces will be then cooled by the bars and will ordinarily only mechanically interlock with the series of holes 27 and 28 and the deformations on the surfaces of the bars although some coalescing between the center portion of the sleeve and the weld metal may occur. In this manner, any embrittlement in high carbon steel bars is limited substantially to the butt face areas thereof.

Referring now to FIG. 4, there is illustrated cast welding apparatus for butt joining vertically extending reinforcing bars. The mold 30 may be comprised of separable mold halves which form the sprue opening 31 and the cavity 32 as well as vertically extending openings 33 and 34 leading into the cavity. A slot 35 need be employed only with the lowermost opening 34 whereby a refractory fibrous material batting 36 may be wrapped around the lowermost reinforcing rod 37 to seal the bottom of the cavity. The sprue opening 31 has a right angle bend 38 therein which feeds into the cavity 32 through opening 39 in sleeve 40. The right angle bend 38 provides the same effect as a pouring basin in that it slows down the weld metal and avoids direct high velocity impingement of the weld metal against the sleeve. The weld metal from crucible 42 will flow into the sleeve and completely fill the same. The amount of charge of exothermic material can be closely controlled whereby the metal will not flow beyond the top 43 of the sleeve 40 to preclude flashing or metal leakage above the sleeve. The sleeve 40 will again be provided with interior deformations or the like to form a mechanical interlock with the weld metal and thereby with the deformations 44 of the reinforcing bars. The cast welding apparatus of FIG. 4 can be utilized more particularly for heavy column reinforcement and, in view of the slight spacing between the ends of the bars, there will be no requirement that the bars be ordered with sawed ends nor will the sleeve have to conform closely to the diameter of the rods. An aligning sleeve 45 of copper or other suitable material may be press-fitted into the tap hole 39 in sleeve 40. This aligning sleeve fits within an end enlargement 46 in graphite mold sprue opening 31 and serves properly to locate and position such mold.

Today, more and more architects are designing free, substantially self-supporting concrete forms for roofs, bridges, etc. of parabolic, spherical, etc. shapes and in many applications, it will be necessary to join steel reinforcing rod on a substantial inclined angle. Accordingly, in FIG. 5 there is illustrated cast welding apparatus which will butt join such reinforcing rod. The mold 50 will be comprised of separable graphite or the like mold halves which when mated form the sprue opening 51 having a right angle bend 52 therein which enters cavity 53 aligned with opening 54 in steel sleeve 55. Again, the sleeve and cavity closely conform. Openings 56 and 57 extending concentrically with the cylindrical cavity 53 accommodate reinforcing bars 58 and 59 so that the ends of such bars will be received within the sleeve in the cavity 53 in the region of the opening 54. The ends of the cavity may be sealed by refractory fibrous batts 60 and 61 wrapped around the deformed exteriors of the bars 58 and 59 and positioned within the slots 62 and 63 formed by the mating mold halves. A crucible 64 may be set upon the top of the mold to produce the molten metal charge to fill the interior of the sleeve 55, butt joining the bars 58 and 59. Means on the interior of the sleeve 55 will be employed mechanically to interlock with the deformations 65 on the exterior of the bars 58 and 59. Also, as in the case of the FIGS. 3 and 4 embodiments, conventional frames and toggle clamps and the like may be employed firmly to hold the mold halves together, locking the cast welding apparatus and the work in the assembled condition shown. Reference may be had to U.S. Patent No. 2,870,499 issued to D. J. Burke and assigned to Erico Products, Inc., of Cleveland, Ohio, for a disclosure of a frame and toggle clamp that may be employed with the present invention.

Figure 6:
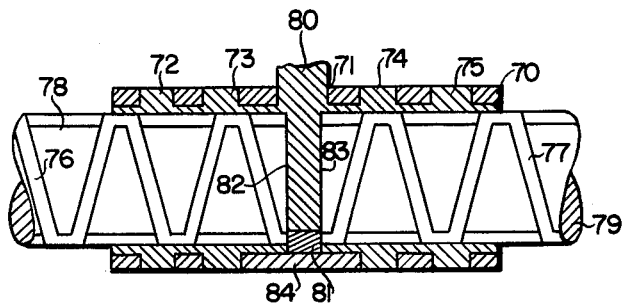

FIG. 6 illustrates a completed joint with the joint longitudinally sectioned to show the joined reinforcing bars in elevation. A sleeve 70 similar to that shown in FIG. 3 may be employed which includes the central tap opening 71 through which the molten metal will enter the interior of the sleeve and the surrounding mold. Here the sleeve is somewhat longer than the sleeve of FIG. 3 and two series of circular apertures 72 and 73 are employed on one side of the sleeve and also two circular annular series 74 and 75 are employed on the other side of the sleeve, mechanically interlocking with the cast weld metal and thereby with the deformations 76 and 77 on the respective bars 78 and 79. Excess metal may extend above the tap hole 71 to create the sprue 80 which may readily be trimmed off if required. Also the shim 81 may be employed to space the ends 82 and 83 of the respective bars as well as to protect the bottom cylindrical surface 84 of the sleeve 70 from the hot molten metal dropping directly thereon. It will be understood that the length and inside and outside diameters of the sleeve may vary depending upon the type of butt joint and strength in such joint required. Moreover, instead of the four annular series of apertures, it is to be understood that further apertures providing a greater mechanical interlock may be employed. Also, the size and distribution of such apertures may vary widely.

It can now be seen that the abutting faces 82 and 83 may be welded together by the heat from the weld metal, this heat being due to the weld metal flowing longitudinally outwardly of the joint. In this manner, any embrittlement in the high carbon steel bars will be limited to the opposing faces 82 and 83 and possibly a very short adjoining region.

Figure 7:
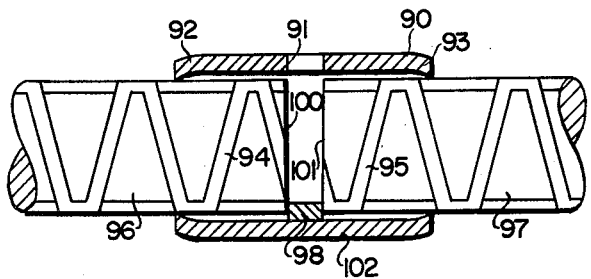
Figure 8:
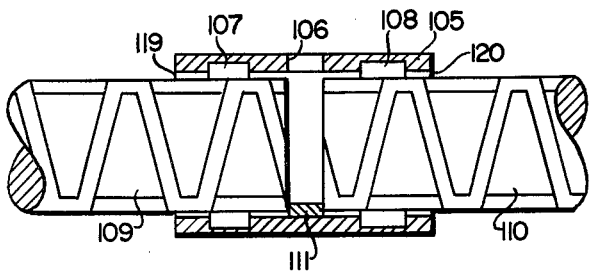
Figure 9:
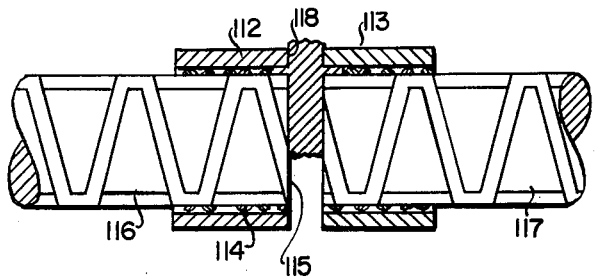

In FIGS. 7, 8 and 9, there are illustrated alternative forms of sleeves which may be employed to form butt bar joints in accordance with the present invention. In FIG. 7, the sleeve 90 is provided with the central top tap hole 91 and the opposite ends 92 and 93 are cupped, such cupped ends providing the requisite mechanical interlock between the sleeve 90 and the deformations 94 aand 95 on the exterior of the bars 96 and 97. Again, a shim 98 may be employed properly to space the ends 100 and 101 of the bars as well as to protect the bottom portion 102 of the sleeve 90 from the molten metal dropping directly thereon.

In FIG. 8, a sleeve 105 is provided with the top central tap hole 106 and internal annular grooves 107 and 108 are formed therein to obtain the mechanical interlock between the sleeve 105 and the deformed bars 109 and 110. Again, a shim 111 may be employed for the same purpose of properly spacing the ends of the bars and protecting the bottom interior surface of the sleeve 105.

In FIG. 9, a pair of sleeves 112 and 113 is illustrated with each sleeve formed from deck plate or the like, such deck plate having a series of surface deformations 114. Both such sleeves 112 and 113 are placed within the mold and the weld metal will not only coalesce the opposed ends 115 of the bars 116 and 117, but will also coalesce the opposed end faces 118 of the sleeves 112 and 113. The weld metal would then enter between the faces 118 of the sleeves to butt weld both the sleeves and the rods and the weld metal would flow longitudinally outwardly to form a sleeve of weld metal between the rods and sleeves 112 and 113 mechanically joining such sleeves to the rods due to the deformations in the external surface of the rods and the internal surface of the sleeves.

It will be understood that in sleeves of the type shown in FIGS. 7 and 8, the sleeves themselves constitute in effect a mold and all that is required to produce a joint is to seal the ends of the sleeves at 119 and 120 in FIG. 8 against the irregular exterior surface of the reinforcing bars to maintain the molten metal within the sleeve which then constitutes a cylindrical mold for the weld metal. The crucible may preferably be placed on top of the sleeve aligned with the tap hole therein or, of course, molten metal may be ladled or poured directly into the tap hole. Similar spring loaded cups or the like may be employed to provide the peripheral seals as shown at 119 and 120 with the required refractory fibrous material and the spring loading will permit the contraction and expansion of the sleeve when the metal is poured therein and subsequently cooled.

Such a preferred apparatus for forming a reinforcing bar butt joint is shown in FIG. 10 wherein the sleeve 130 surrounds butting reinforcing bars 131 and 132 which are only very slightly spaced as shown at 133. Such sleeve is provided with a central aperture 134 and internal deformations in the form of square threads or annular grooves as shown at 135 and 136. A graphite member 138 having a pouring basin 139 therein with an opening 140 communicating the pouring basin with the sleeve aperture 134 is placed directly on the top of the sleeve and a graphite crucible 141 is placed above the graphite pouring basin 138. A copper or the like aligning sleeve 142 is loosely press-fitted in the aperture 134 and serves to locate and position the pouring basin 138 and thus crucible 141 with respect to the sleeve 130. Thermite powder 143 may be placed within the crucible and a starting powder 144 is placed on top of such thermite powder. A cap or cover plate 145 may then be employed to cover the crucible. The ends of the sleeve may be enclosed by centering and sealing cups 146 and 147 enclosing a packing material as shown at 148 and 149, respectively, of the aforementioned felted graphite or alumina-silica fibers or even asbestos, so that the ends of the sleeve are properly centered and sealed against the deformations on the exterior of the reinforcing bars. In forming the cast weld joint, the thermite powder will be ignited by the starting powder and the molten metal will then run into the pouring basin 139 and through the sleeve 142 into the annular space between the sleeve and the reinforcing bars.

The close butting of the reinforcing bars as shown in FIG. 10 prevents the impingement of molten metal falling through the sleeve 142 directly against the interior of the sleeve 130. This precludes then the possibility of the molten metal melting the sleeve wall interior which may cause a defect in the sleeve structure resulting in a joint failure at such point. Moreover, if the velocity of the molten metal coming through the tap opening is high enough, the molten metal stream rebounds off the reinforcing bar and strikes the interior walls of the sleeve 130. In cross-section using the clock system, the points of impingement would be 1:30 and 10:30. To prevent this rebounding effect, the pouring basin is employed which slows the velocity of the molten metal coming from the crucible. The velocity of such molten metal is caused by the potential energy due to the height of the crucible from the tap hole. Thus the pouring basin takes the direct impact from the crucible and slows this flow. It will, of course, be understood that such pouring basin may be employed in the FIGS. 1 and 3 embodiment of the present invention.

In a joint of the type produced by the structure of FIG. 10, the weld metal which fills the interstices formed by the deformations on the exterior of the reinforcing bar and the interior of the sleeves serves as a transfer medium to transfer by shear and compression the load from the reinforcing bar via its deformations to the sleeve via its internal grooving. In the joint formed by the FIG. 10 embodiment, preferably no coalescing will take place between the weld metal and the reinforcing bar or the sleeve. The advantage in using a thermit mixture is that it gives a material which is physically strong and which can be delivered in a molten state so that as a medium it fills all the voids of the irregularly shaped steel bars. It will, of course, be understood that other hardenable materials as, for example, epoxy cement could suitably be employed with the proper length coupling sleeve. In the FIG. 10 butt joint, mill scale which tightly adheres to the reinforcing bar need not be removed since there will be no bonding as by a weld or solder type joint. It will, of course, be understood that the present joint provides certain advantages over electric or other type welding in that generally the welding of reinforcing bar depends on the composition of the steel and since the specifications of the bars are quite loose concerning the steel chemical composition, the welding is a matter of considerable trial and error and the proper procedures could change easily from lot to lot. Also, electric welding generally involves quite complicated pre and post heating situations.

In FIG. 11, there is illustrated a steel sleeve which may be employed with the present invention, such sleeve 150 having a central tap hole 151 and being internally formed with buttress threads as shown at 152 which may preferably slope at 10°. These buttress threads serve as the internal deformations which serve to lock the coupling sleeve 150 on the adjacent butted ends of reinforcing bar. Another and perhaps more economical thread type that may be employed is a conventional Acme thread which may have sloping sides of 14½°.

While buttress or Acme threads may produce a joint having extremely fine tensile characteristics, it has been found that excess motion of the reinforcing bars may occur. This is due to the sloping side of the thread in restraining shrinkage toward the center of the sleeve. It has been found that the sides of the thread or deformation must offer restraint to motion of the casting or weld metal in both longitudinal directions. The reason for this is quite obvious when the load is tensiley applied. However, it is just as important to restrain the metal from shrinking toward the center of the sleeve when it solidifies. The importance of controlling the shrinkage results from the fact that the bars must move or strain to engage the side of the fill metal which will be in compression when the tensile load is applied. If the fill metal is allowed to shrink toward the center of the sleeve, the compression side is moved away from contact with the groove or deformation. This extra shrinkage then must be taken up when a load is applied. Thus, it is necessary to have motion (strain) on the bars before the load is picked up. This may be very detrimental in many type joints as excess movement of the bars will cause cracking of the concrete or compressive failure of the concrete against the deformation on the reinforcing bar. It has been found that with square cut threads or square annular grooves as shown in the preferred form in FIG. 10, such excessive motion of the bars is eliminated and an extremely fine joint is obtained.

The cross-sectional area of such sleeves may be determined approximately from the mathematical formula:

$$A_{sleeve} = \frac{A_{bar} \times S_{bar}}{S_{sleeve}} (+\text{Area lost by taphole})$$

A is area (in square inches)
S is tensile stress (in pounds per square inch)

It is, therefore, possible to have sleeves of various cross-sectional area depending on the ultimate stress of the sleeve material and the minimum ultimate tensile stress of the reinforcing bar. The height of the sleeve deformations may generally be 50% of the minimum height of the bar deformations. The following is a table indicating various desirable sleeve dimensions in relation to bar sizes:

| Bar Size | Sleeve | | Bar Deformations | | Ratio of Internal Deformation/Max. Average Spacing |
|---|---|---|---|---|---|
| | Over-all Length | Internal Deformation Length | Internal Deformation Height | Max. Aver. Spacing (Inches) | Minimum Height (Inches) | |
| #11 | 6 | 2 | .040 | .987 | .071 | 2.03 |
| #14S | 7 | 2½ | .040 | 1.185 | .085 | 2.11 |
| #18S | 9 | 3½ | .060 | 1.58 | .102 | 2.2% |

The fabrication of such sleeves may be by rolling heavy deck plate or screen or the like and arc welding the seam thereof. This type of fabrication of the sleeve has generally been found to be cheaper than seamless tubing which may also be employed.

It can now be seen that there is obtained a relatively thin layer of weld or initially flowable metal between the sleeve and bar which reduces the heating of the bar (especially high-carbon bar) which would embrittle the bar in the regions spaced from the butt ends and thus form a defective joint. The cast weld metal fills the space between the sleeve and bars and is mechanically interlocked with the deformation on the bars.

It is, of course, important to know the composition of the material that one is trying to join. There are many different thermit welding compositions which will produce sound crack-free joints in steel of one composition, but not necessarily in steel of another composition. Reference may be had to Cadwell Patent No. 2,229,045 for a disclosure of exothermic reaction mixes that may be used with the present invention. A thermit mixture that has been found to produce good quality joints in high carbon steels is the following:

| | Percentage by weight |
|---|---|
| Copper oxide (scale) | 73.9 |
| Copper aluminum alloy (50/50) | 17.6 |
| Tin (metal powder) | 3.9 |
| Calcium fluorspor | 2.3 |
| Calcium silicon | 2.3 |
| | 100.0 |

Other thermit mixes that have been found suitable for the joining of reinforcing bars are:

| | |
|---|---|
| Copper oxide (scale) | 65.5 |
| Aluminum (atomized powder) | 13.1 |
| Iron oxide (Fe$_3$O$_4$, mill scale) | 17.1 |
| Calcium fluorspor | 2.1 |
| Calcium silicon | 2.2 |
| | 100.0 |

| | |
|---|---|
| Copper oxide (scale) | 74.0 |
| Aluminum (atomized powder) | 11.7 |
| Iron oxide (Fe$_3$O$_4$, mill scale) | 9.6 |
| Calcium fluorspor | 2.3 |
| Calcium silicon | 2.4 |
| | 100.0 |

| | |
|---|---|
| Copper oxide (scale) | 73.2 |
| Copper aluminum alloy (50/50) | 17.4 |
| Iron (metal powder) | 4.8 |
| Calcium fluorspor | 2.3 |
| Calcium silicon | 2.3 |
| | 100.0 |

| | |
|---|---|
| Copper oxide (scale) | 71.2 |
| Copper aluminum alloy (50/50) | 19.8 |
| Iron oxide (Fe$_3$O$_4$, mill scale) | 4.6 |
| Calcium fluorspor | 2.2 |
| Calcium silicon | 2.2 |
| | 100.0 |

| | |
|---|---|
| Iron oxide (Fe$_3$O$_4$, mill scale) | 73.5 |
| Aluminum (atomized powder) | 22.8 |
| Calcium fluorspor | 1.8 |
| Calcium silicon | 1.9 |
| | 100.0 |

It is noted that some of the aforementioned mixes may employ low grade mill scale since the electrical properties of the weld metal are of no great importance in the joining of steel reinforcing bars.

It can now be seen that there has been disclosed a method and apparatus for producing narrow tremely strong butt joints for steel bars. Moreover, in the joint, the cast weld metal is contained within a coupling sleeve simplifying the casting procedures. This sleeve mechanically joins the two bars together and spaces any area of possible embrittlement. Furthermore, the sleeve rigidifies the joint, such generally being stronger than the cast metal and, moreover, the sleeve is of substantially lower cost than the otherwise required weld metal. Thus a narrow joint of high tensile strength, low cost, and good appearance is provided.

Other modes of applying the principle of the invention may be employed, change being made as regards the details described, provided the features stated in any of the following claims or the equivalent of such be employed.

We therefore particularly point out and distinctly claim as our invention:

1. The method of butt joining deformed steel reinforcing bars and the like comprising the steps of slightly spacing the opposed ends of such bars, enclosing such spaced ends with a metal sleeve providing an annular mold chamber defining space between such bars and sleeve, such sleeve having internal deformations therein, and introducing molten metal into such sleeve in the region of such spaced opposed ends to cause the molten metal to enter between such bars while also substantially filling the remainder of such annular mold chamber defining space between such bars and sleeve; such molten metal when solidified mechanically interlocking such metal and sleeve while also mechanically interlocking such metal and bars in regions spaced outwardly from such opposed ends to provide a high tensile strength butt joint.

2. Casting apparatus for butt joining irregular surface reinforcing bars comprising a generally cylindrical sleeve mold having a generally cylindrical cavity therein adapted to receive opposed ends of such bars, a tap hole generally centrally located in said sleeve adapted to receive molten metal or the like, and internal deformations in said sleeve mold adapted mechanically to lock with the irregular surface of such bars when such mold is filled with such molten metal and such metal solidifies, said sleeve being internally formed with grooves having lateral surfaces in planes perpendicular to the axis of said sleeve adapted thus mechanically to lock with the irregular surface of such bars when said sleeve is filled with such molten metal.

3. Apparatus as set forth in claim 2 including a pouring basin mounted on such tap hole, and a crucible mounted on said pouring basin laterally offset from such tap hole.

4. Apparatus for butt splicing the opposed ends of deformed metal reinforcing bars and the like comprising a refractory pouring basin, a generally cylindrical recess in said pouring basin, a tap hole in said pouring basin leading to such recess, a cylindrical metal sleeve in such recess and removable therefrom, closely conforming thereto, and adapted to encompass the opposed ends of such bars while providing an annular mold chamber defining space between such sleeve and bars, and a generally centrally located tap hole in said sleeve aligned with the tap hole in said pouring basin for the introduction of molten metal into said sleeve from said pouring basin, said sleeve being of sufficient strength and integrity with respect to said bars and said molten metal to form a rigid strengthening member of a joint therewith upon solidification of said molten metal.

5. Apparatus as set forth in claim 4 including a crucible mounted on said pouring basin and laterally offset from the tap hole therein.

6. Apparatus as set forth in claim 4 including internal deformations in said sleeve adapted mechanically to interlock with the molten metal introduced therein.

7. Apparatus as set forth in claim 4 including internal grooves in said sleeve having at least one lateral surface extending perpendicular to the axis of said sleeve adapted mechanically to interlock with the molten metal introduced therein.

8. Apparatus for butt splicing the opposed ends of deformed reinforcing bars comprising a sleeve freely slidable onto such bars while nevertheless reasonably closely fitting such bars thus providing an annular mold chamber defining space between such bars and sleeve; said sleeve having a cross sectional area inversely proportional to the ultimate stress of the sleeve material and directly proportional to the cross sectional area and minimum ultimate tensile stress of such bars, the required ultimate tensile load of the sleeve being approximately equal to the required ultimate tensile load of the bars to be joined, a generally centrally located tap hole in said sleeve adapted to be positioned adjacent the opposed ends of such bars, internal grooves in said sleeve having shoulders extending normal to the axis of said sleeve, and said annular mold chamber defining space being adapted to receive a metal filler material introduced thereinto through said tap hole while molten to fill said sleeve between such bars and to flow axially outwardly to fill such grooves and the deformed portions of such bars thus interlocking said sleeve and bars when said filler material solidifies.

9. Casting apparatus for butt splicing the opposed ends of irregular surface steel reinforcing bars comprising a generally cylindrical steel sleeve adapted to receive and closely fit the opposed end portions of such bars while extending along a substantial length of the latter and providing an annular mold chamber defining space between such sleeve and bars, said sleeve having a plurality of transversely extending shoulders on its inner surface adapted mechanically to lock with the irregular surfaces of such bars when the space between said sleeve and such end portions is filled with molten metal and such metal is solidified, said sleeve also having a generally centrally located tap hole therethrough adapted to be positioned closely adjacent to such ends of such bars for introduction of such molten metal.

10. Apparatus for butt splicing the opposed ends of deformed metal reinforcing bars and the like comprising a refractory pouring basin, a generally cylindrical recess in said pouring basin, a tap hole in said pouring basin leading to such recess, a cylindrical metal sleeve in such recess closely conforming thereto adapted to encompass the opposed ends of such bars while providing an annular mold chamber defining space between such sleeve and bars, a generally centrally located tap hole in said sleeve aligned with the tap hole in said pouring basin for the introduction of molten metal into said sleeve from said pouring basin, and a guide tube projecting from said tap hole in said sleeve into said tap hole in said pouring basin to facilitate alignment of said tap holes and the support of said pouring basin on said sleeve.

11. Apparatus for butt splicing the opposed ends of deformed metal reinforcing bars and the like comprising a refractory pouring basin, a generally cylindrical recess in said pouring basin, a tap hole in said pouring basin leading to such recess, a cylindrical metal sleeve in such recess closely conforming thereto adapted to encompass the opposed ends of such bars while providing an annular mold chamber defining space between such sleeve and bars, a generally centrally located tap hole in said sleeve aligned with the tap hole in said pouring basin for the introduction of molten metal into said sleeve from said pouring basin, and a shield in said sleeve diametrically opposite the tap hole therein operative to protect said sleeve from direct molten metal impingement and to space the opposed ends of such bars.

12. Apparatus for butt splicing the opposed ends of deformed reinforcing bars comprising a sleeve freely slidable onto such bars while nevertheless reasonably closely fitting such bars thus providing an annular mold chamber defining space between such bars and sleeve, said sleeve having a cross sectional area inversely proportional to the ultimate stress of the sleeve material and directly proportional to the cross sectional area and minimum ultimate tensile stress required of such bars, the required ultimate tensile load of the sleeve being approximately equal to the required ultimate tensile load of the bars to be joined, a generally centrally located tap hole in said sleeve adapted to be positioned adjacent the opposed ends of such bars, internal grooves in said sleeve having shoulders extending normal to the axis of said sleeve, said annular mold chamber defining space being adapted to receive a metal filler material introduced thereinto through said tap hole while molten to fill said sleeve between such bars and to flow axially outwardly to fill such grooves and the deformed portions of such bars thus interlocking said sleeve and bars when said filler material solidifies, a guide tube mounted in said tap hole, a pouring basin mounted on said guide tube, and a crucible mounted on said pouring basin adapted to contain an exothermic reaction mix which when ignited will produce said molten metal filler material.

13. Apparatus as set forth in claim 4 wherein the required ultimate tensile load of the sleeve is approximately equal to the required ultimate tensile load of the bars to be joined.

References Cited by the Examiner

UNITED STATES PATENTS

| | | | |
|---|---|---|---|
| 198,317 | 12/1877 | Steen | 22—116 |
| 381,438 | 4/1888 | Smith | 18—36 |
| 558,271 | 4/1896 | Falk | 22—206 |
| 1,389,785 | 9/1921 | Riblet | 22—116 |
| 1,793,047 | 2/1931 | Brewitt | 22—116 |
| 2,259,282 | 10/1941 | Williams et al. | 22—116 |
| 2,313,074 | 3/1943 | Jewell | 285—114 |
| 2,601,351 | 6/1952 | Wilburn | 287—108 |
| 2,887,743 | 5/1959 | Burke | 22—116 |
| 2,932,863 | 4/1960 | Ahlert | 22—116 |
| 2,957,214 | 10/1960 | Kuharski | 22—203 |
| 2,991,105 | 7/1961 | Chiville | 287—108 |
| 3,004,310 | 10/1961 | Burke | 22—116 |
| 3,020,610 | 2/1962 | Rejdak | 22—203 |
| 3,113,359 | 12/1963 | Burke | 22—16 |

FOREIGN PATENTS

| | | |
|---|---|---|
| 10,763 | 4/1908 | Denmark. |
| 1,248,693 | 11/1960 | France. |
| 511,989 | 8/1939 | Great Britain. |
| 873,012 | 7/1961 | Great Britain. |

J. SPENCER OVERHOLSER, *Primary Examiner.*

W. A. SCHEEL, D. L. RECK, MICHAEL V. BRINDISI, WILLIAM J. STEPHENSON, *Examiners.*